(12) United States Patent
Ikeya

(10) Patent No.: US 7,318,360 B2
(45) Date of Patent: Jan. 15, 2008

(54) GEAR SHIFT LEVER OPERATING MECHANISM

(75) Inventor: Shinji Ikeya, Kanuma (JP)

(73) Assignee: Ikeya Formula Co., Ltd., Tochigi (JP)

( * ) Notice: Subject to any disclaimer, the term of this patent is extended or adjusted under 35 U.S.C. 154(b) by 705 days.

(21) Appl. No.: 10/502,161

(22) PCT Filed: Jan. 23, 2002

(86) PCT No.: PCT/JP02/00464

§ 371 (c)(1),
(2), (4) Date: Jul. 21, 2004

(87) PCT Pub. No.: WO03/062008

PCT Pub. Date: Jul. 31, 2003

(65) Prior Publication Data

US 2005/0081669 A1  Apr. 21, 2005

(51) Int. Cl.
*F16H 63/20* (2006.01)
*B60K 20/02* (2006.01)

(52) U.S. Cl. .................. 74/473.3; 74/337.5; 74/473.21

(58) Field of Classification Search ............... 74/337.5, 74/473.21, 473.3
See application file for complete search history.

(56) References Cited

FOREIGN PATENT DOCUMENTS

| JP | 44-9136 B1 | 4/1969 |
|---|---|---|
| JP | 5950/1978 | 1/1978 |
| JP | 171249/1984 | 11/1984 |
| JP | 116258/1986 | 7/1986 |
| JP | 9561/1988 | 1/1988 |
| JP | 2000-314476 | 11/2000 |
| JP | 2001-263485 | 9/2001 |
| JP | 2001-295923 | 10/2001 |

*Primary Examiner*—William C Joyce
(74) *Attorney, Agent, or Firm*—Jordan and Hamburg LLP

(57) ABSTRACT

A handling mechanism of a gearshift which enable to shift endlessly into neutral, first-speed, second-speed, third-speed, fourth-speed, fifth-speed, neutral, first-speed, second-speed, third-speed, fourth-speed, fifth-speed for example can be used for the wire-typed and lot-typed transmission. The gearshift handling mechanism can be shifted endlessly and mechanically into neutral, first-speed, second-speed, third-speed, fourth-speed, fifth-speed, neutral, first-speed, second-speed, third-speed, fourth-speed, fifth-speed for example via the operation lever which is moved in the forward-backward direction.

2 Claims, 22 Drawing Sheets divide # GEAR SHIFT LEVER OPERATING MECHANISM

BACKGROUND ART

The present invention relates generally to a handling mechanism of a gearshift which can handle a shift fork of a manual transmission as a transmission for motorcycle via a wire or lot.

The conventional handling mechanism of the transmission for the motor cycle has a mechanism that shifts up or down into neutral, first-speed, second-speed, third-speed, fourth-speed, fifth-speed, fourth-speed, third-speed, second-speed and first-speed one by one.

In the conventional transmission for motorcycle, it is shifted up and down by one gear so that it is impossible to shift efficiently.

Accordingly, it is an object of the present invention to provide a gearshift handling mechanism which can be shifted endlessly into neutral, first-speed, second-speed, third-speed, fourth-speed, fifth-speed, fourth-speed, third-speed, second-speed and first-speed and can be used for the wire-typed and lot-typed transmission.

The present invention is understood to encompass embodiments which include all or only a portion of the above objects, features and advantages which, unless recited in claims defining the invention, are understood not to limit interpretation of such claims. The above, and other objects, features and advantages of the present invention will become apparent from the following description read in conjunction with the accompanying drawings, in which like reference numerals designate the same elements.

It is to be expressly understood, however, that the drawings are for the purpose of illustration and description only, and are not intended as a definition of the limits of the invention.

DISCLOSURE OF THE INVENTION

Accordingly, the gearshift handling mechanism includes a case body attached in a box of a gear-shifting mechanism of a manual transmission having a pair of side plates which are placed at a fixed space; a support axle attached at an upper part of the center portion of the case body so as to project both ends thereof from the side plates outwardly; an operation lever attached to a part which is projected from one of the side plate of the support axle, shifting due to rotate at a predetermined degree, biasing by a spring to one way; a pivot shaft attached rotatably at a part adjacent the one end of the case body so as to project both ends thereof from the side plates outwardly; a cam for shifting the gear, which is attached fixedly to a part which is positioned between the side plates of the pivot shaft, having a first guide groove, which is formed in the shape of a ring, projecting three projections outwardly at one side surface thereof, capable of guiding neutral, first-speed, second-speed, third-speed, fourth-speed, fifth-speed and neutral in series; a guide groove for reverse, guiding an outer circumferential part to a fifth-speed direction from a part between neutral and fifth-speed when it rotates to an opposite direction; a triangle eccentric second guide groove formed another surface thereof, which is formed in the shape of a ring, capable of guiding neutral, first-speed, second-speed, third-speed, fourth-speed, fifth-speed and neutral clockwise and counterclockwise in series; and an engaging step part formed at the outer circumferential part of one side surface, capable of preventing to shift into said fifth-speed from neutral; a first arm supported rotatably by the support axle which is placed between the side plates, having a first engaging pin formed at a top part thereof and engaging with the first guide groove and guide groove for reverse of the cam, and handling the shift fork of the manual transmission via a wire or lot; a second arm supported rotatably by the support axle which is placed between the side plates, having a second engaging pin formed at a top part thereof and engaging with the second guide groove of the cam, and handling the shift fork of the manual transmission via the wire or lot, a rotary disk fixed to a projection part from one of the side plates of the pivot shaft, having engaging pins which are positioned between neutral, first-speed, second-speed, third-speed, fourth-speed, fifth-speed and positioned at a part adjacent the outer circumferential part between at least two rotary plates; a rod supported pivotably at a lower part of the operation lever, engaging an engaging part defining a top portion thereof with the engaging pins of the rotary disk in series and allowing the rotary disk to rotate by in accordance with the rotation of the operation lever to the forward-backward direction, biasing the engaging part to the engaging direction against the engaging pins; a fitting cam attached fixedly to a projected part from another side plate of the pivot shaft, having six concave parts, capable of fitting the pivot shaft to neutral, first-speed, second-speed, third-speed, fourth-speed, fifth-speed; a fitting piece fixed to a projection part from another side plate of the support axle, having an engaging piece which engages with the concave parts of the fitting cam; and a reverse lever which engages with an engaging step part which is attached to the case body so as to bias to contact with the outer part which is formed the engaging step part of the cam and is prevented to shift into fifth-speed from neutral, capable of shifting into reverse in accordance with releasing an engaging state.

DETAILED DESCRIPTION

Figure 1:
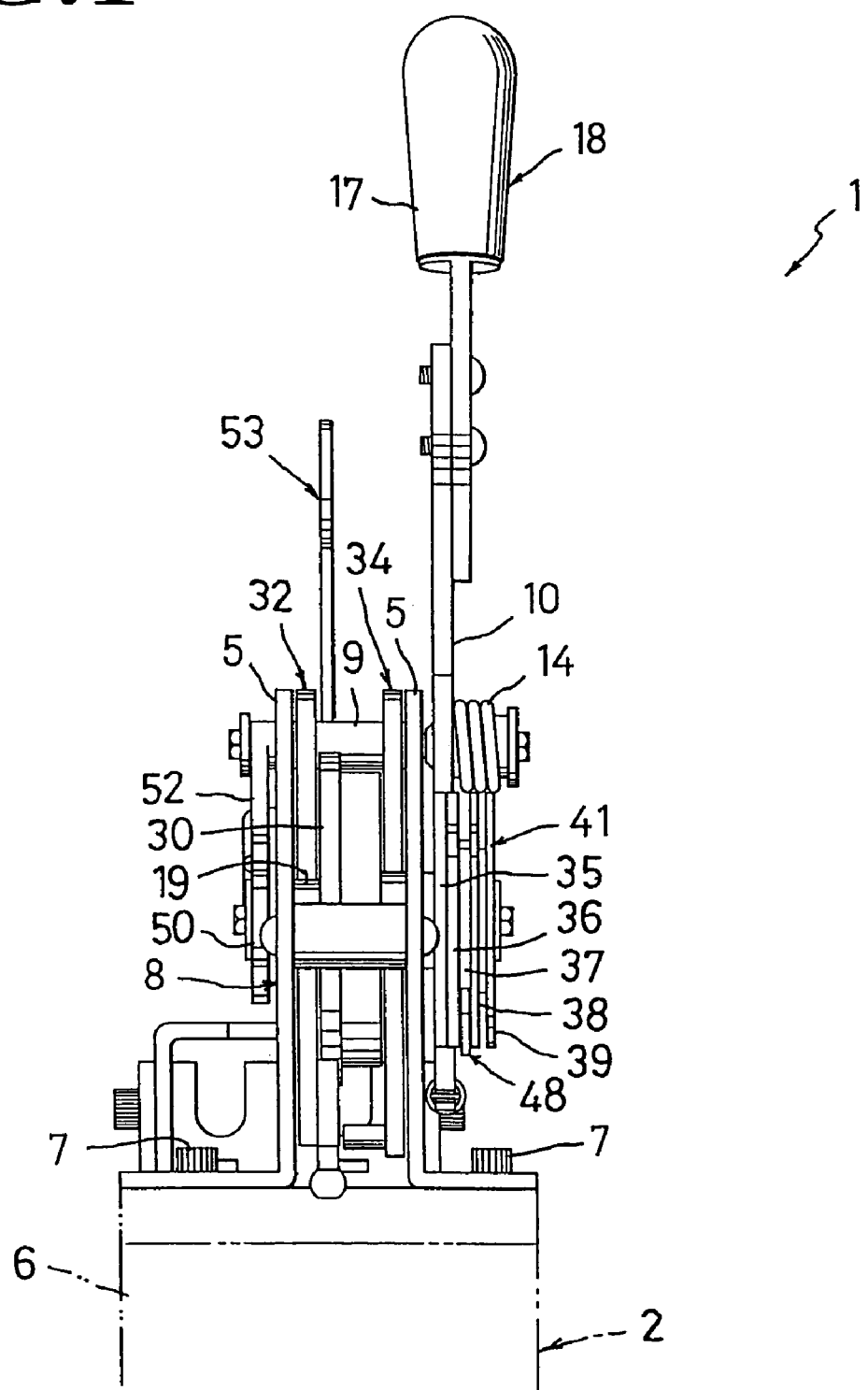
FIG. 1 is a front view showing a first embodiment of the present invention.
Figure 2:
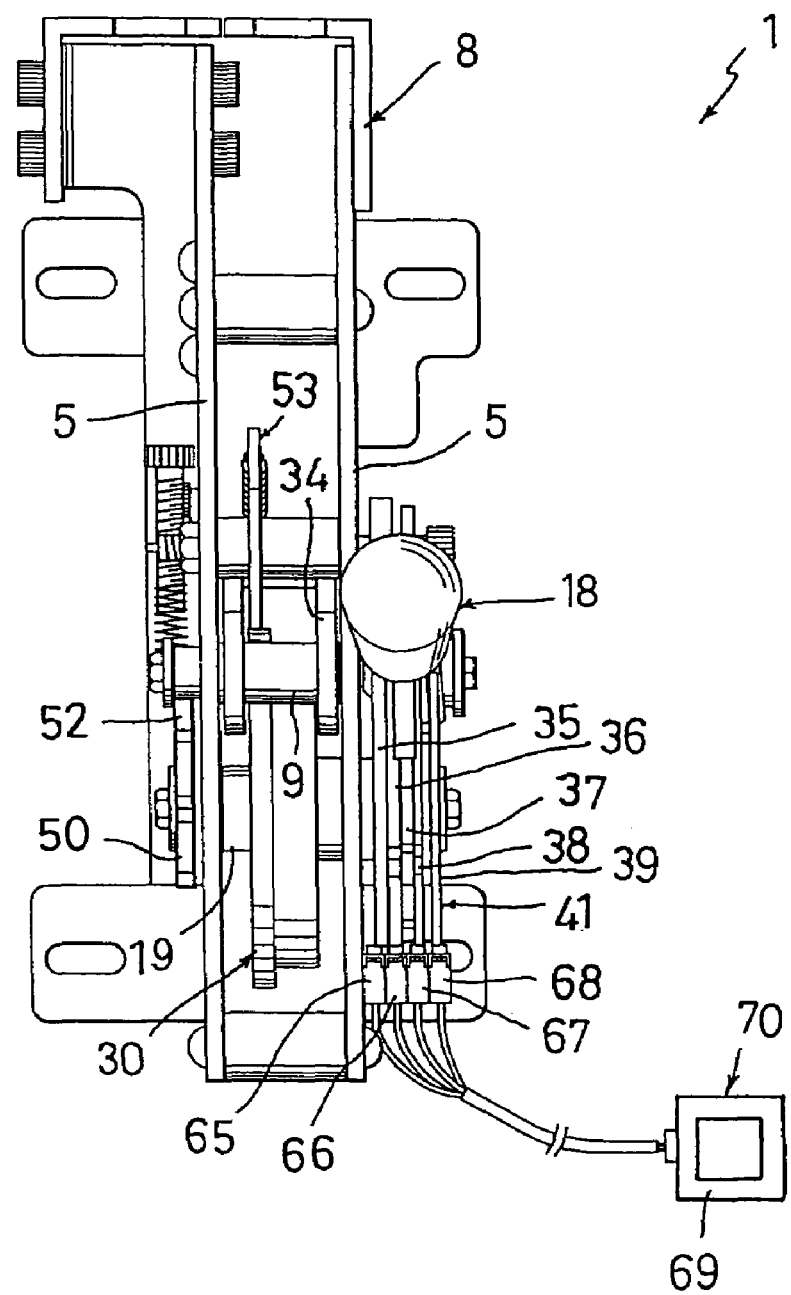
FIG. 2 is a top view showing a first embodiment of the present invention.
Figure 3:
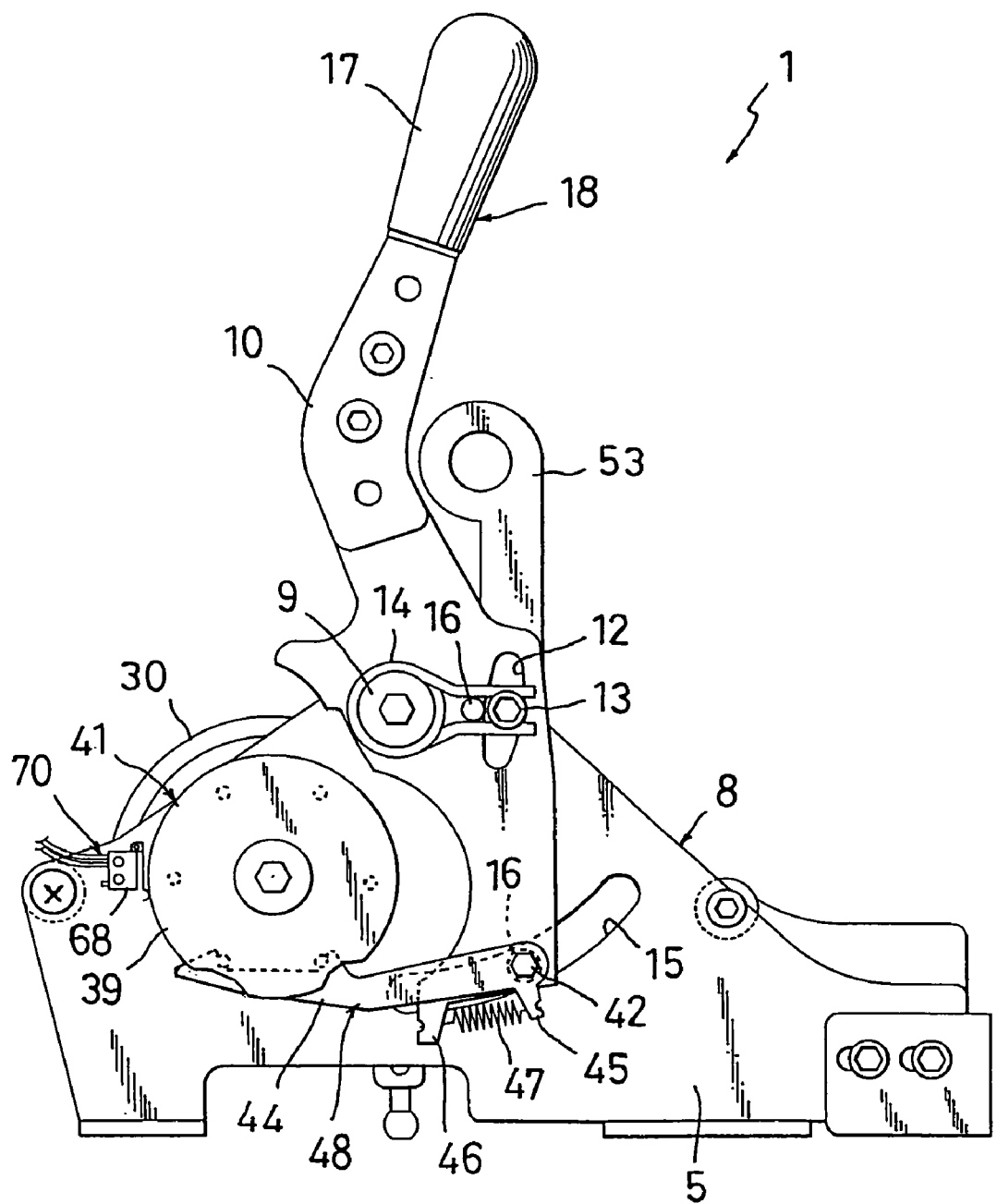
FIG. 3 is a right side view showing a first embodiment of the present invention.
Figure 4:
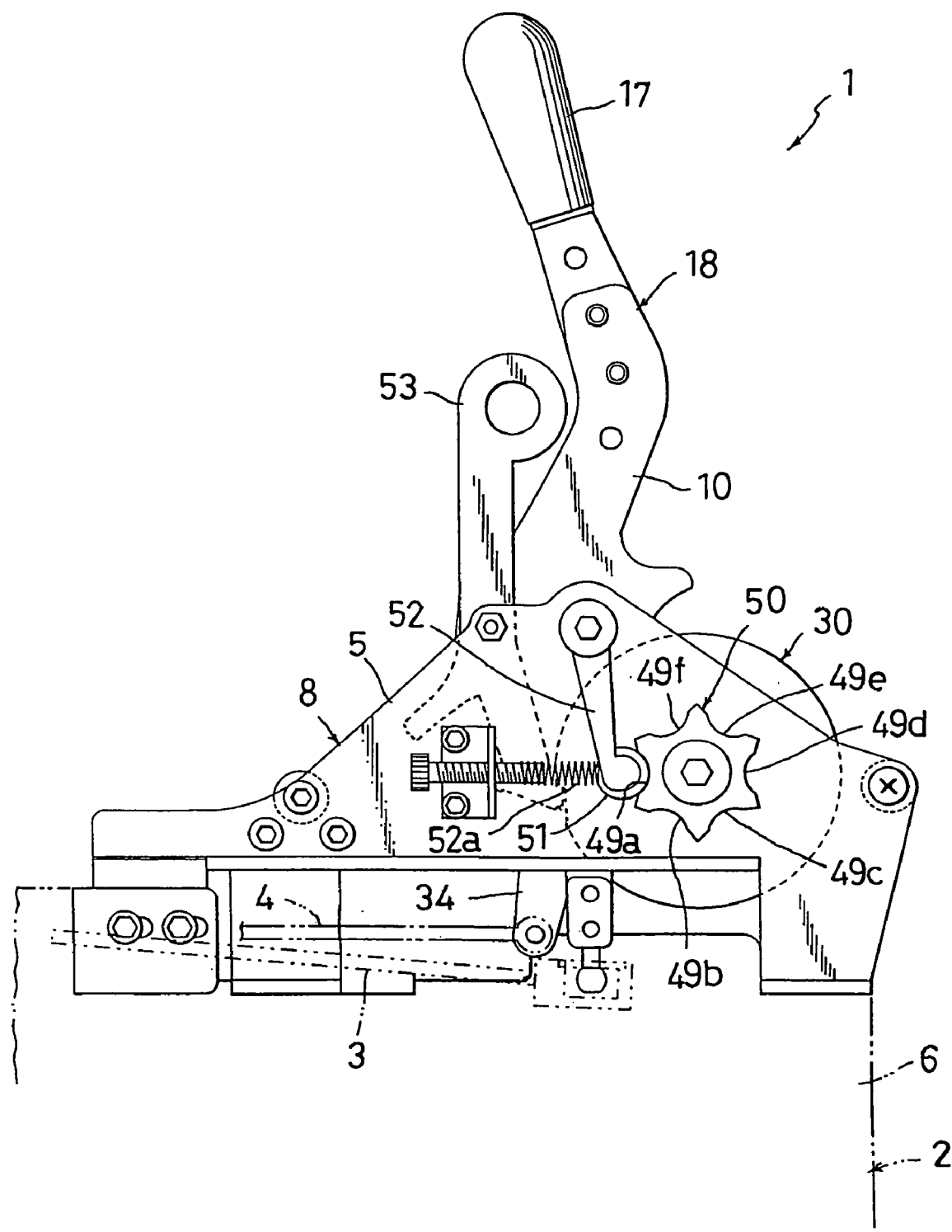
FIG. 4 is a left side view showing a first embodiment of the present invention.
Figure 5:
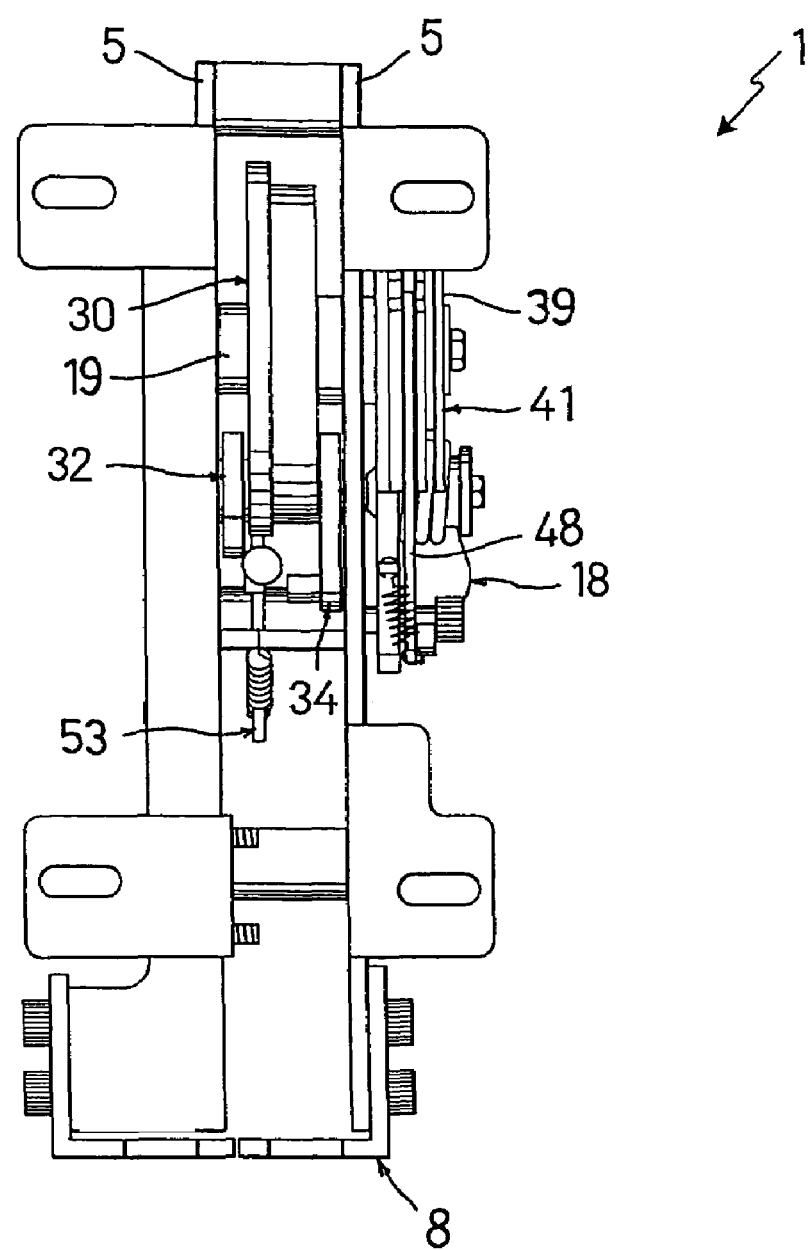
FIG. 5 is a bottom view showing a first embodiment of the present invention.
Figure 6:
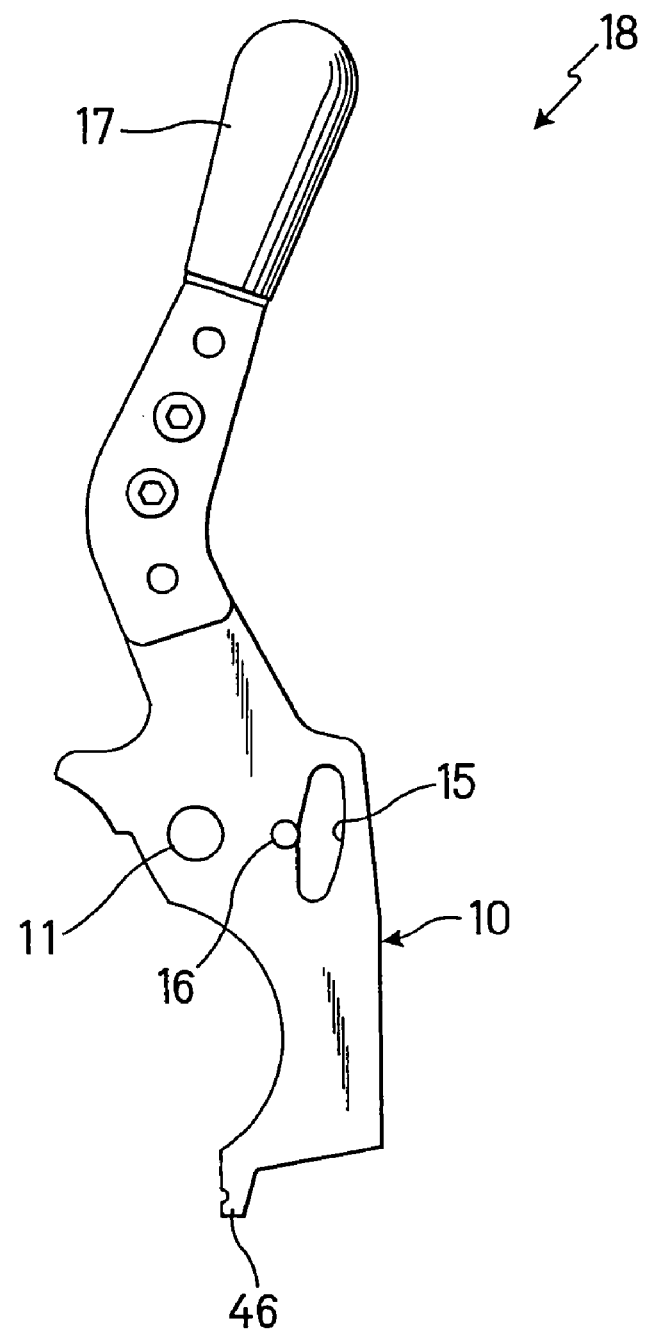
FIG. 6 is an explanation view of a gearshift showing a first embodiment of the present invention.
Figure 7:
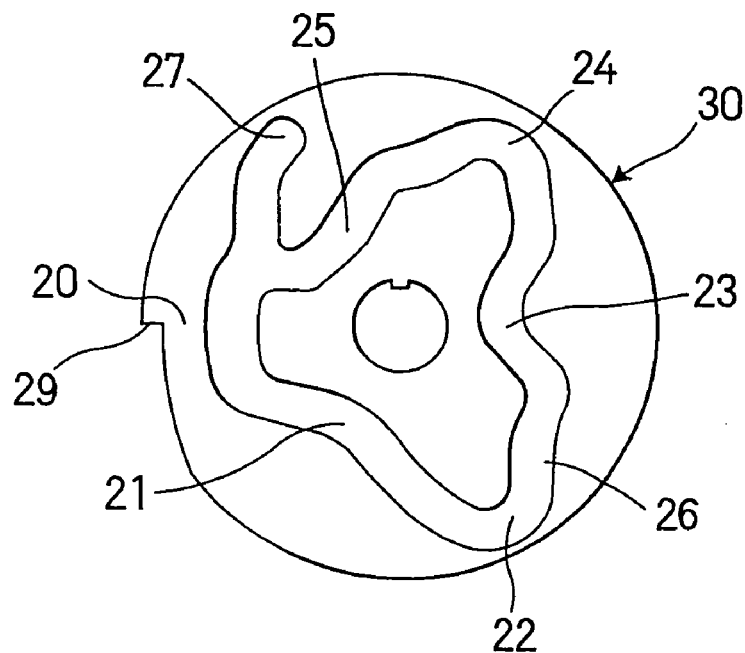
FIG. 7 is a left side view showing a cam for shifting showing a first embodiment of the present invention.
Figure 8:
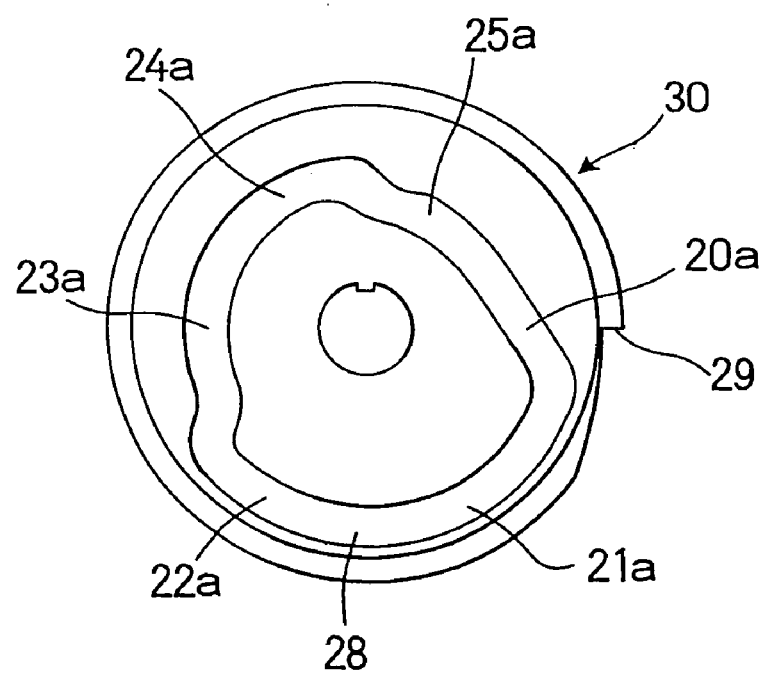
FIG. 8 is a right side view a cam for shifting showing a first embodiment of the present invention.
Figure 9:
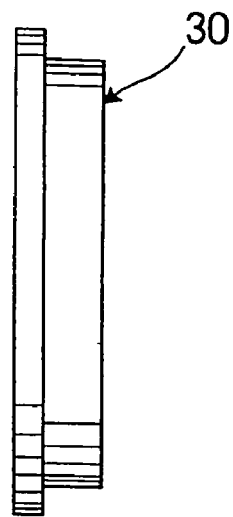
FIG. 9 is a front view a cam for shifting showing a first embodiment of the present invention.
Figure 10:
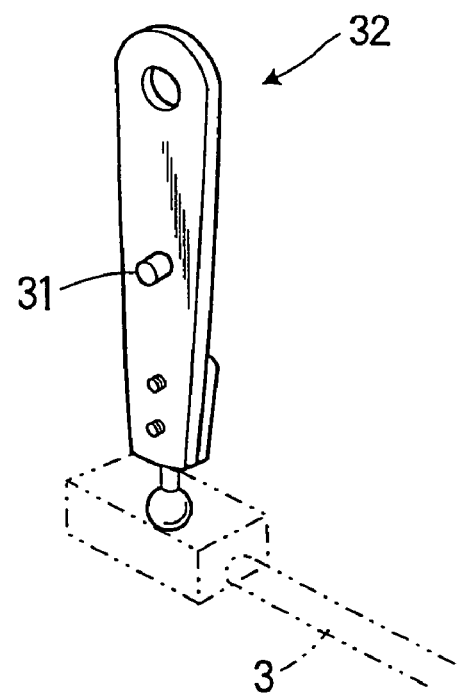
FIG. 10 is an explanation view of a first arm showing a first embodiment of the present invention.
Figure 11:
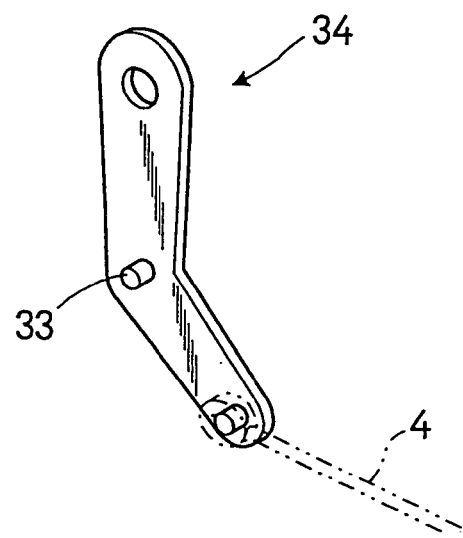
FIG. 11 is an explanation view of a second arm showing a first embodiment of the present invention.
Figure 12:
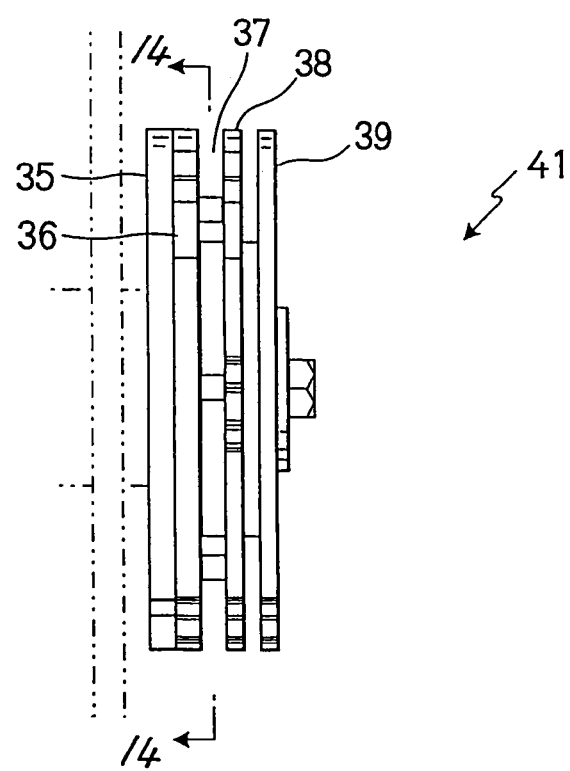
FIG. 12 is a front view showing a rotary disk showing a first embodiment of the present invention.
Figure 13:
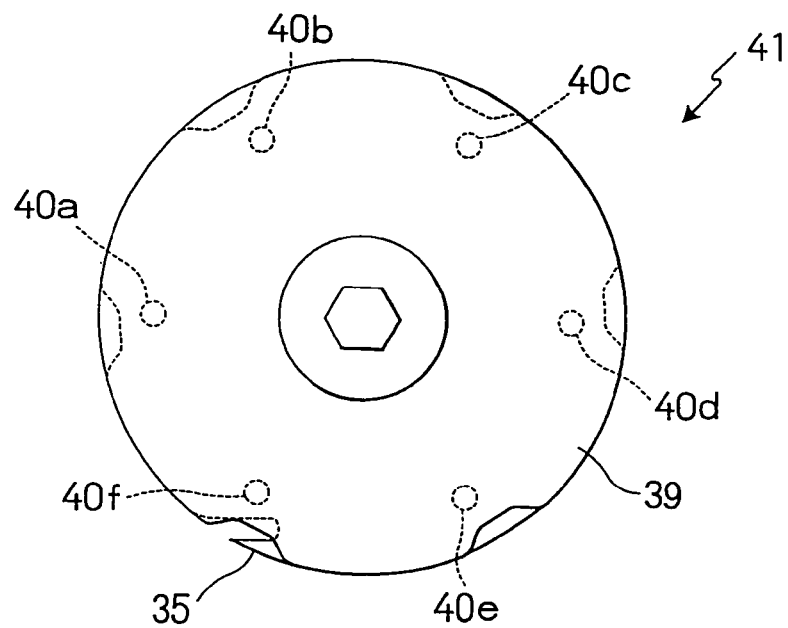
FIG. 13 is a side view a rotary disk showing a first embodiment of the present invention.
Figure 14:
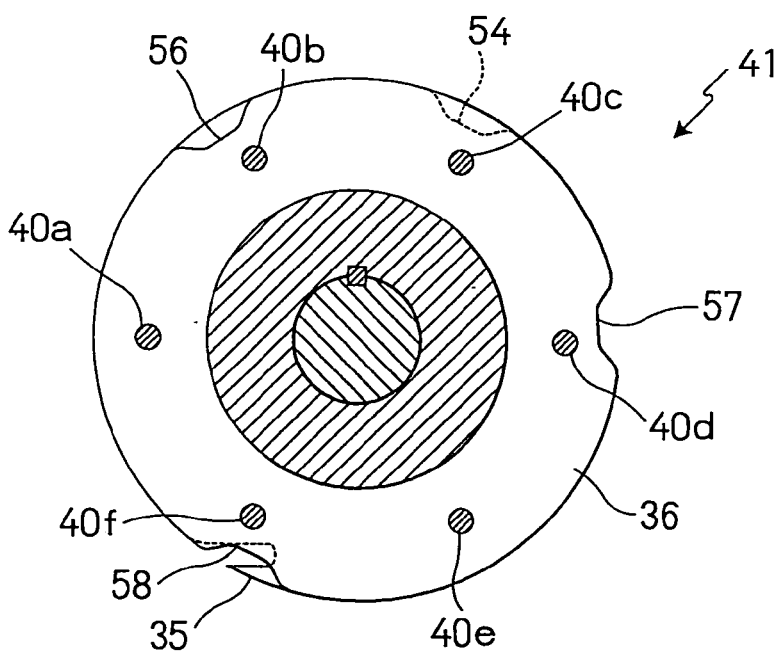
FIG. 14 is a cross sectional view taken along a line 14-14 of FIG. 12 showing a first embodiment of the present invention.
Figure 15:
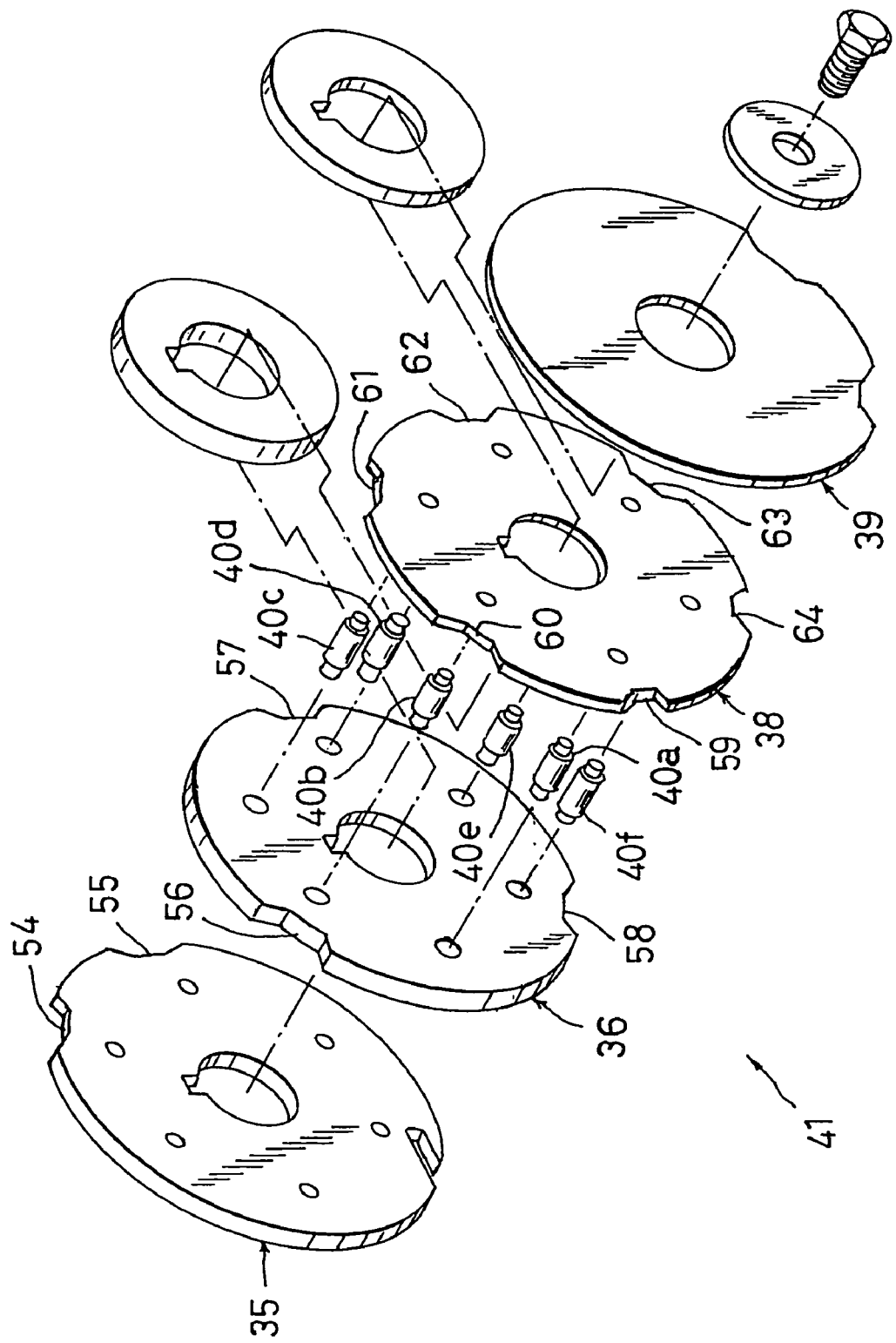
FIG. 15 is an expanded view a rotary disk showing a first embodiment of the present invention.
Figure 16:
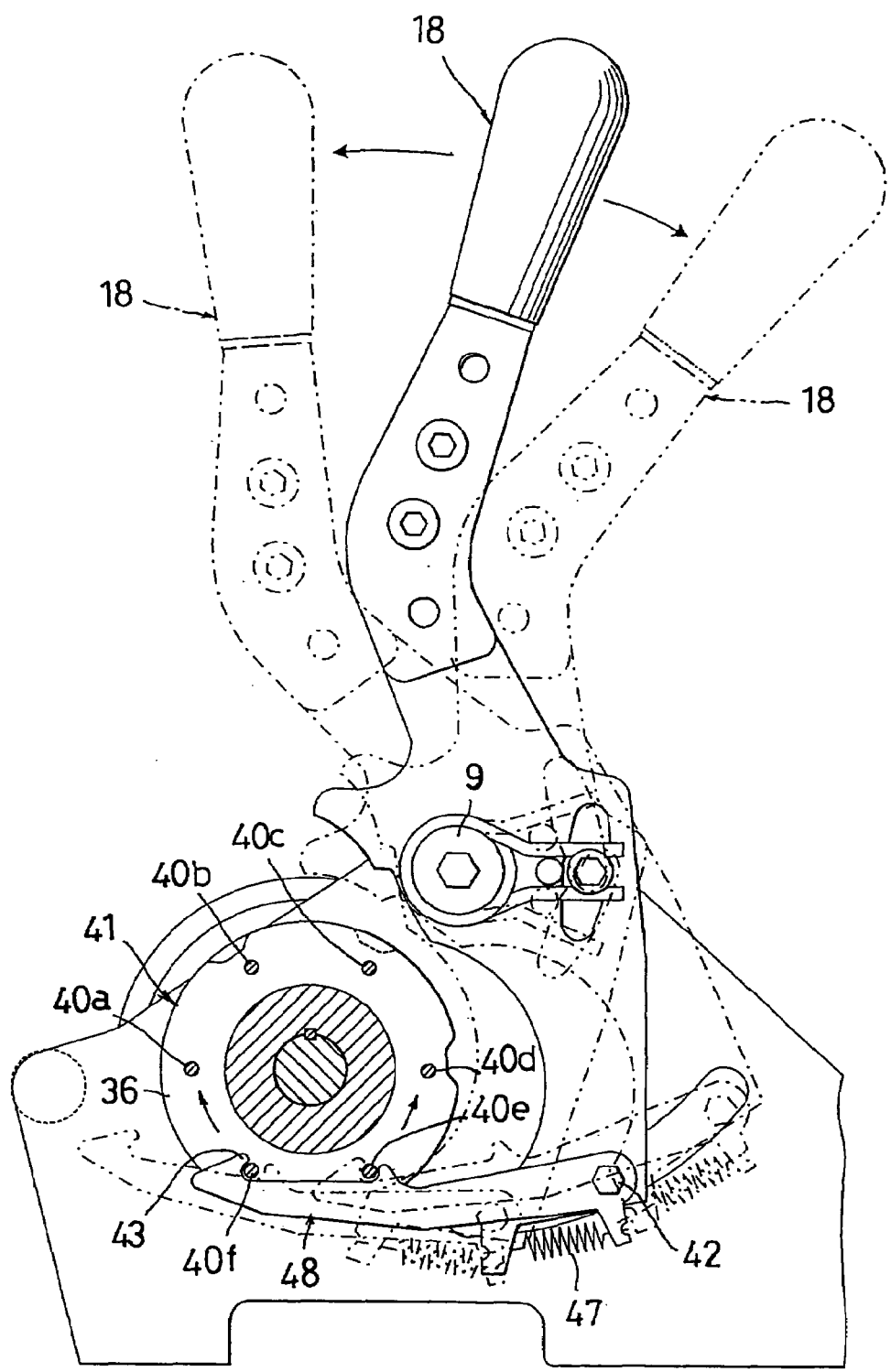
FIG. 16 is an explanation view showing the way in which a rotary dick rotates.
Figure 17:
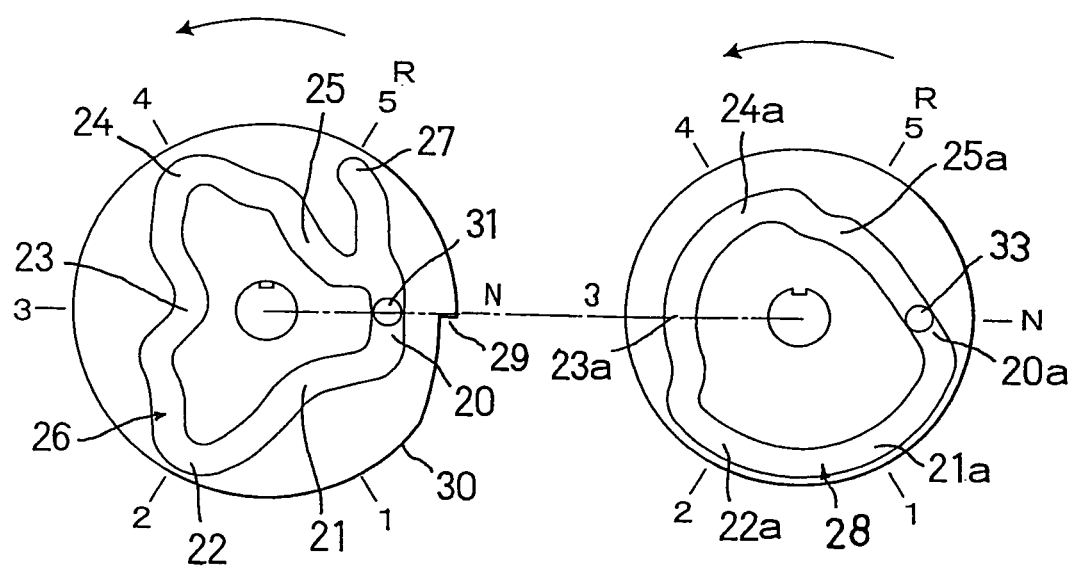
FIG. 17 is an explanation view showing a neutral state showing a first embodiment of the present invention.
Figure 18:
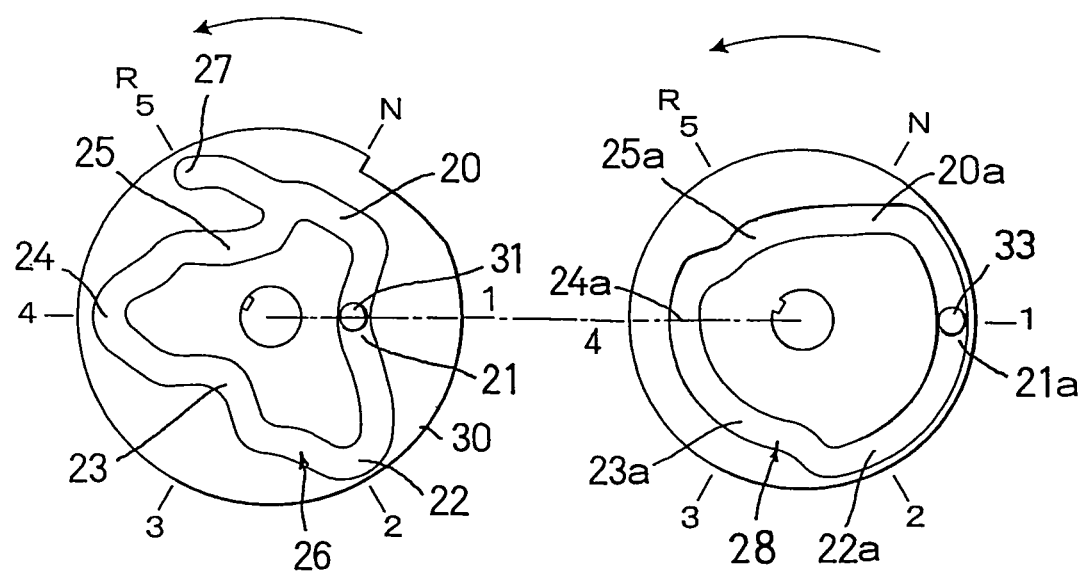
FIG. 18 is an explanation view showing a first-gear state showing a first embodiment of the present invention.
Figure 19:
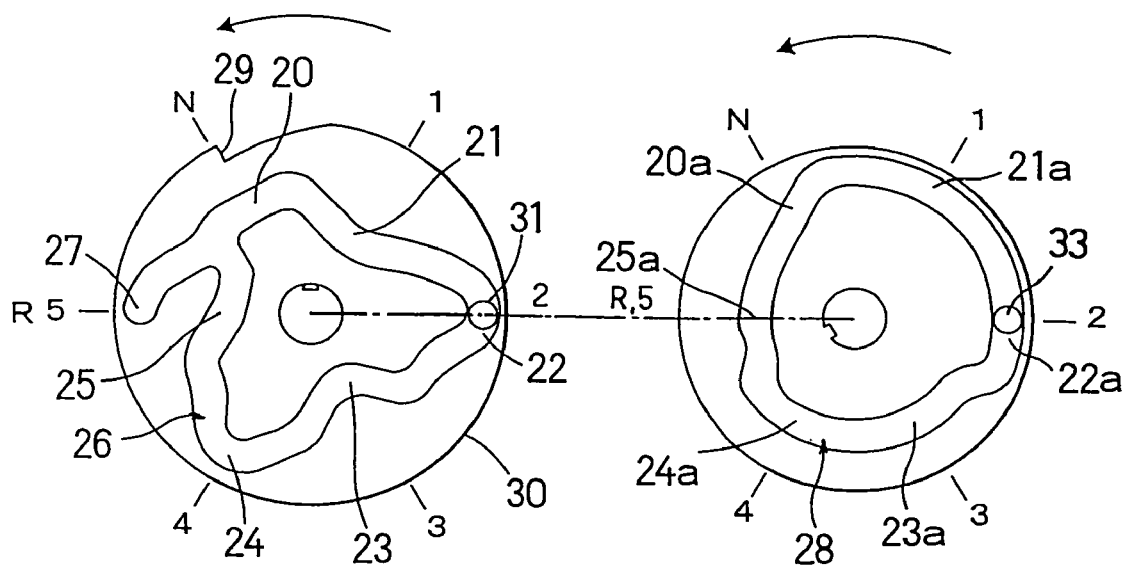
FIG. 19 is an explanation view showing a second-gear state showing a first embodiment of the present invention.
Figure 20:
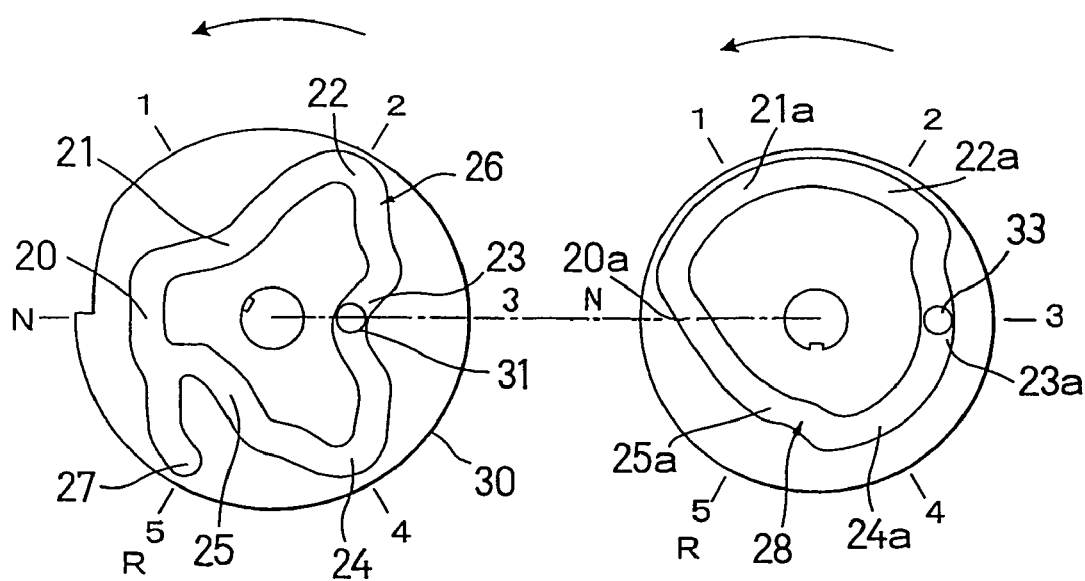
FIG. 20 is an explanation view showing a third-gear state showing a first embodiment of the present invention.
Figure 21:
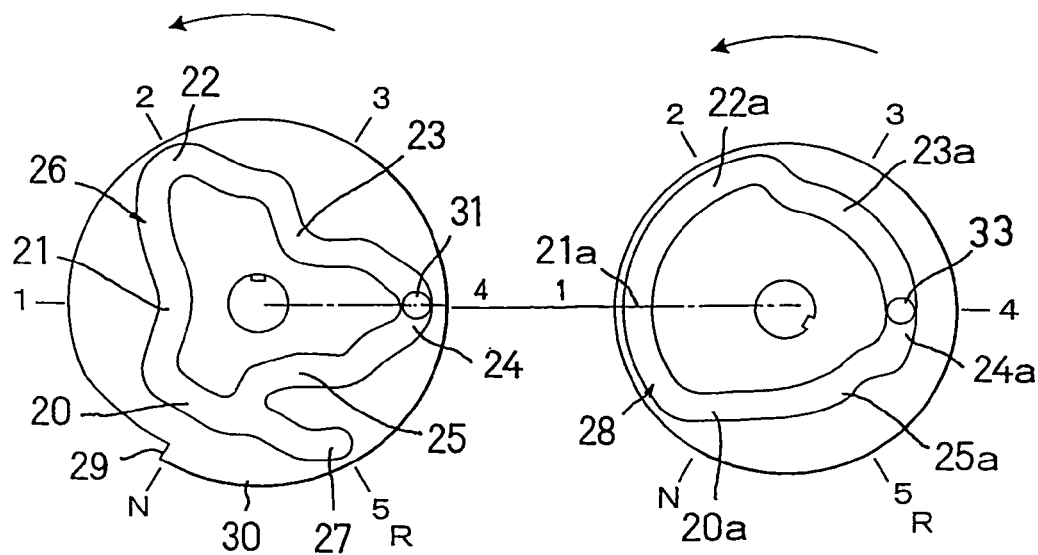
FIG. 21 is an explanation view showing a fourth-gear state showing a first embodiment of the present invention.
Figure 22:
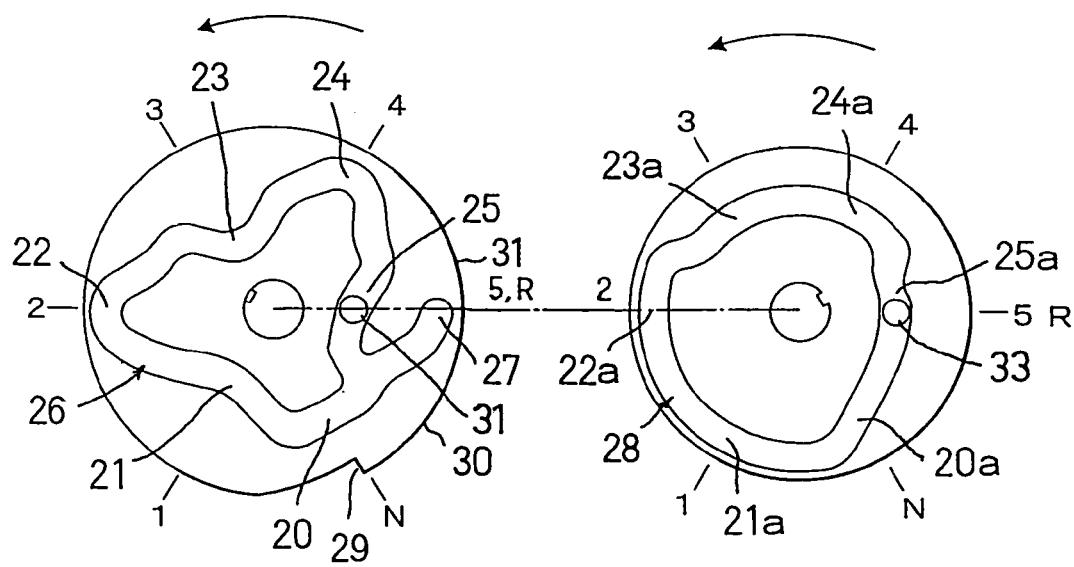
FIG. 22 is an explanation view showing a fifth-gear state showing a first embodiment of the present invention.
Figure 23:
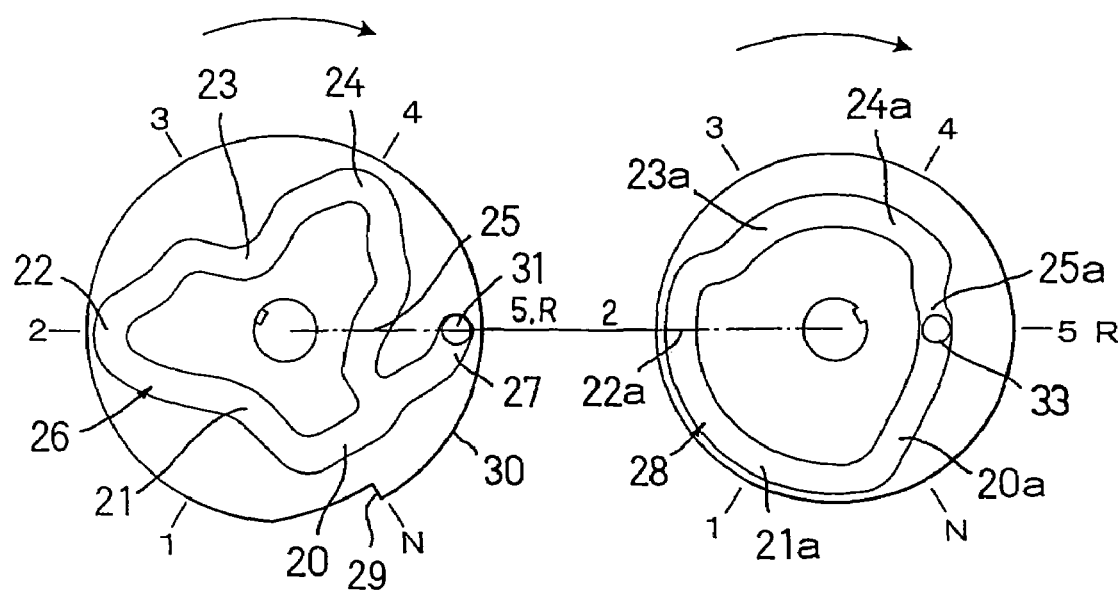
FIG. 23 is an explanation view showing a reverse state showing a first embodiment of the present invention.

Preferred embodiments of the present invention are described in more detail below referring to the accompanying drawings. An understanding of the present invention may be best gained by reference FIGS. 1 to 23. Reference numeral 1 designates a gearshift handling mechanism which changes the a shift fork of a manual transmission 2 endlessly via a wire or lot 3, 4, that is shifted into neutral, first-speed, second-speed, third-speed, fourth-speed, fifth-speed, neutral, first-speed, second-speed, third-speed, fourth-speed, fifth-speed. The gearshift handling mechanism 1 is comprised of a case body 8, a support axle 9, an operation lever 18, a pivot shaft 19, a cam 30 for shifting the gear, a first arm 32, a second arm 34, a rotary disk 41, a rod 48, a fitting cam 50, a fitting piece 52, a reverse lever 53 and a shift indicator 70.

The case body 8 is attached in a box 6 of the gear-shifting mechanism 2 of the manual transmission having a pair of side plates 5, 5 which are placed at a fixed space via a plurality of bolts 7.

The support axle 9 is attached at an upper part of the center portion of the case body 8 so as to project both ends thereof from the side plates 5, 5 outwardly.

The operation lever 18 is shifted by rotating forward and backward direction, having a grip part 17 provided at a top portion thereof and is further comprised of an operation lever body 10, an elongated hole 12 which is formed in the shape of an arch, a fitting pin 13, a coiled spring 14, a guide pin 16. The operation lever body 10 is supported pivotably a center portion thereof by a part which projected from one of the side plate 5 of the support axle 9. The elongated hole 12 is formed at the operation lever body 10, supported pivotably at a pivoting part 11 which is placed at a part adjacent the center part of the operation lever body 10. The fitting pin 13 is provided fixedly to the one of the side plates 5 so as to position at the center part of the elongated hole 12 at the center position that the operation lever body 10 can be rotated. The coiled spring 14 is attached to the support axle 9 and allows the operation lever body 10 which contacts to the upper and lower portions of the fitting pin 13 to position at the center part therein. The guide pin 16 is attached to the lower part of the operation lever body 10, engaging with a guide hole 15, which is formed in the shape of an arc, which is formed at one of the side plates 5, identifying the pivoting part as a supporting point.

The pivot shaft 19 is attached at a part adjacent the one end of the case body 8 rotatably so as to project both ends thereof from the side plates 5, 5 outwardly.

The cam 30 is further comprised of a first guide groove 26 which is formed in the shape of a ring, projecting three projections outwardly; a guide groove 27 for reverse; a triangle eccentric second guide groove 28 which is formed in the shape of a ring and an engaging step part 29. The first guide groove 26 is attached fixedly a part between the side plates of the pivot shaft 19, capable of guiding a neutral 20, a first-speed 21, a second-speed 22, a third-speed 23, a fourth-speed 24, a fifth-speed 25, and the neutral 20 in series. The guide groove 27 guides the outer circumferential part to the fifth-speed direction from a part between the neutral 20 and the fifth-speed 25 when it rotates to the opposite direction. The second guide groove 28 can guide a neutral 20a, a first-speed 21a, a second-speed 22a, a third-speed 23a, a fourth-speed 24a, a fifth-speed 25a, and the neutral 20a at another side face thereof clockwise and counterclockwise in series. The engaging step part 29 is positioned at the outer circumferential part of the one side portion and is prevented to rotate from the neutral 20 to the fifth-speed 25.

The first arm 35 is supported rotatably by the support axle 9 which is placed between the side plates 5, 5, having an engaging pin 31 formed at the top part thereof and engaging with the first guide groove 26 and second guide groove 27 of the cam 30, and handling the shift fork of the manual transmission via the wire or lot 3.

The second arm 34 is supported rotatably by the support axle 9 which is placed between the side plates 5, 5, having an engaging pin 33 formed at the top part thereof and engaging with the second guide groove 28 of the cam 30, and handling the shift fork of the manual transmission via the wire or lot 4.

The rotary disk 41 is further comprised of at least two rotary plates, the first and second rotary plates 35, 36 which overlaps each other in this embodiment, fixing a projection part from one of the side plates 5 of the pivot shaft 19; third and fourth rotary plates 38, 39 which is provided via a space 37; and engaging pins 40a, 40b, 40c, 40d, 40e and 40f which are positioned at a part adjacent the outer circumferential part of the second plate 36 and third plate 38 and between the neutral 20, the first-speed 21, the second-speed 22, the third-speed 23, the fourth-speed 24, the fifth-speed 25.

The rod 48 is further comprised of a rod body 44 and a coiled spring 48. The rod body 44 is supported pivotably at the lower part of the operation lever 18 by a pivot pin 42, engaging an engaging part 43 defining a top portion thereof with the engaging pins 40a, 40b, 40c, 40d, 40e and 40f of the rotary disk 41 in series and allowing the rotary disk 41 to rotate by in accordance with the rotation of the operation lever 18 to the forward and backward directions. The coiled spring 47 biases the engaging part 43 of the rod body 44 to the direction that the engaging pins 40a, 40b, 40c, 40d, 40e and 40f are engaged, engaged with an engaging part 45 defined by the back end part of the rod body 44 and an engaging part 46 defined by a part adjacent one end of the lower part of the operation lever 18.

The fitting cam 50 is attached fixedly to a projected part from the another side plate 5 of the pivot shaft 19, having concave part 49a, 49b, 49c, 49d, 49e and 49f, capable of fitting the pivot shaft 19 to the neutral 20, the first-speed 21, the second-speed 22, the third-speed 23, the fourth-speed 24, the fifth-speed 25.

The fitting piece 52 is fixed to a projection part from another side plate 5 of the support axle 9, having an engaging piece 51, which is formed in the shape of a roller, engages with the concave part 49a, 49b, 49c, 49d, 49e and 49f of the engaging cam 50.

The reverse lever 53 engages with the engaging step part 29 attached to the case body 8 so as to bias to contact with the outer part which is formed the engaging step part 29 of the cam 30 and is prevented to shift to the fifth-speed 25 from the neutral 20, capable of shifting the reverse in accordance with releasing the engaging state.

The shift indicator 70 is further comprised of concave parts 54, 55 for the second and third-speed, which is formed at the outer circumferential part of the second-speed 22 and third-speed 23 of the rotary plate 35 of the rotary disk 41; concave parts 56, 57, 58 for the first, third and fifth-speed, which is formed at the outer circumferential part of the first-speed 21, the third-speed 23 and the fifth-speed 25 of the second rotary plate 36; concave parts 59, 60, 61, 62, 63 and 64 for the first, second, third, fourth and fifth-speed, which is formed at the outer circumferential part of the neutral 20, first-speed 21, the second-speed, the third-speed 23, the fourth-speed 24 and the fifth-speed 25 of the third rotary plate 38; four switches 65, 66, 67 and 68 including micro switch, which works by the concave parts of the first, second, third and fourth rotary plates 35, 36, 37 and 38; and an indicator 69 which indicates the shifting state in accordance with ON or OFF state of the switches 65, 66, 67 and 68.

When the rotary disk 41 is positioned into neutral 20, the first arm 32 is positioned into the part which positions the first engaging pin 31 at the part of the neutral 20 of the first guide groove 26 of the cam 30, and the second arm 34 is positioned into the part which positions the second engaging pin 33 at the part of the neutral 20 of the second guide groove 28. Then the shift fork of the manual transmission is shifted into neutral via the wire or lot 3, 4.

When shifting into first-speed from neutral 20, the operation lever 18 pulls the engaging pin 40a of the rotary disk 41 that engages the engaging part 43 of the rod 48, and the rotary disk 41 is rotated at 60 degrees. In addition, the engaging pin 40b and the engaging part 43 of the rod 48 engage due to the biasing operation of the coiled spring 14 biasing the operation lever 18.

In accordance with the rotation of the rotary disk 41, the pivot shaft 19 and cam 30 also rotate, the first arm 32 is operated so as to position the engaging pin 31 to a part of first-speed 21 of the first guide groove 26, and the second arm 34 is operated so as to position the second engaging pin 33 to a part of first-speed 21a of the second guide groove 28. Then, the shift fork of the manual transmission is shifted into first-speed via the wire or lot 3, 4.

When shifting into second-speed from first-speed, the operation lever 18 pulls the engaging pin 40b of the rotary disk 41 that engages the engaging part 43 of the rod 48, and the rotary disk 41 is rotated at 60 degrees. In addition, the engaging pin 40c and the engaging part 43 of the rod 48 engage due to the biasing operation of the coiled spring 14 biasing the operation lever 18.

In accordance with the rotation of the rotary disk 41, the pivot shaft 19 and cam 30 also rotate, the first arm 32 is operated so as to position the engaging pin 31 to a part of second-speed 22 of the first guide groove 26, and the second arm 34 is operated so as to position the second engaging pin 33 to a part of second-speed 22a of the second guide groove 28. Then the shift fork of the manual transmission is shifted into second-speed via the wire or lot 3, 4.

When shifting into third-speed from second-speed, the operation lever 18 pulls the engaging pin 40c of the rotary disk 41 which engages the engaging part 43 of the rod 48, and the rotary disk 41 is rotated at 60 degrees. In addition, the engaging pin 40d and the engaging part 43 of the rod 48 engage due to the biasing operation of the coiled spring 14 biasing the operation lever 18.

In accordance with the rotation of the rotary disk 41, the pivot shaft 19 and cam 30 also rotate, the first arm 32 is operated so as to position the engaging pin 31 to a part of third-speed 23 of the first guide groove 26, and the second arm 34 is operated so as to position the second engaging pin 33 to a part of third-speed 23a of the second guide groove 28. Then the shift fork of the manual transmission is shifted into third-speed via the wire or lot 3, 4.

When shifting into fourth-speed from third-speed, the operation lever 18 pulls the engaging pin 40d of the rotary disk 41 that engages the engaging part 43 of the rod 48, and the rotary disk 41 is rotated at 60 degrees. In addition, the engaging pin 40e and the engaging part 43 of the rod 48 engage due to the biasing operation of the coiled spring 14 biasing the operation lever 18.

In accordance with the rotation of the rotary disk 41, the pivot shaft 19 and cam 30 also rotate, the first arm 32 is operated so as to position the engaging pin 31 to a part of fourth-speed 24 of the first guide groove 26, and the second arm 34 is operated so as to position the second engaging pin 33 to a part of fourth-speed 24a of the second guide groove 28. Then the shift fork of the manual transmission is shifted into fourth-speed via the wire or lot 3, 4.

When shifting into fifth-speed from fourth-speed, the operation lever 18 pulls the engaging pin 40e of the rotary disk 41 that engages the engaging part 43 of the rod 48, and the rotary disk 41 is rotated at 60 degrees. In addition, the engaging pin 40f and the engaging part 43 of the rod 48 engage due to the biasing operation of the coiled spring 14 biasing the operation lever 18.

In accordance with the rotation of the rotary disk 41, the pivot shaft 19 and cam 30 also rotate, the first arm 32 is operated so as to position the engaging pin 31 to a part of fifth-speed 28 of the first guide groove 26, and the second arm 34 is operated so as to position the second engaging pin 33 to a part of fifth-speed 25a of the second guide groove 28. Then the shift fork of the manual transmission is shifted into fourth-speed via the wire or lot 3, 4.

When shifting into neutral from fifth-speed, the operation lever 18 pulls the engaging pin 40f of the rotary disk 41 which engages the engaging part 43 of the rod 48, and the rotary disk 41 is rotated at 60 degrees. In addition, the engaging pin 40a and the engaging part 43 of the rod 48 engage due to the biasing operation of the coiled spring 14 biasing the operation lever 18.

In accordance with the rotation of the rotary disk 41, the pivot shaft 19 and cam 30 also rotate, the first arm 32 is operated so as to position the engaging pin 31 to a part of neutral 20 of the first guide groove 26, and the second arm 34 is operated so as to position the second engaging pin 33 to a part of neutral 20a of the second guide groove 28. Then the shift fork of a manual transmission is shifted into fourth-speed via the wire or lot 4.

Therefore, it can be shifted endlessly such as neutral, first-speed, second-speed, third-speed, fourth-speed, fifth-speed and neutral by one step.

In addition, when the operation lever 18 is operated to the opposite direction, it can be shifted into fifth-speed, fourth-speed, third-speed, second-speed and first-speed by one step.

At that time, when shifting into fifth-speed from neutral, the back lever 53 engages the engaging step part 29 of the cam 30, and the operation lever 18 cannot be operated. Therefore, it is prevented to shift into fifth-speed from neutral.

When shifting the reverse lever 53 from neutral, the engaging step part 29 of the cam 30 is released from the fitting state. Then the operation lever 18 is rotated to the opposite direction so that it pushes the engaging pin 40*a* of the rotary disk 41 that engages the engaging part 43 of the rod 48, and the rotary disk 41 is rotated at 60 degrees to the opposite direction. In addition, the engaging pin 40*f* and the engaging part 43 of the rod 48 engage due to the biasing operation of the coiled spring 14 biasing the operation lever 18.

In accordance with the reverse-rotation of the rotary disk 41, the pivot shaft 19 and cam 30 also rotate to opposite direction, the first arm 32 is operated so as to position the engaging pin 31 into the guide groove 27 for reverse from the part in neutral 20 of the first guide groove 26, and the second arm 34 is operated so as to position the second engaging pin 33 to the part in fifth-speed 25*a* of the second guide groove 28. Then the shift fork of a manual transmission is shifted into reverse via the wire or lot 4.

Other embodiments of the present invention will now be described referring to FIGS. 24 to 29. Through the drawings of the embodiments, like components are denoted by like numerals as of the first embodiment and will not be further explained in great detail.

Figure 24:
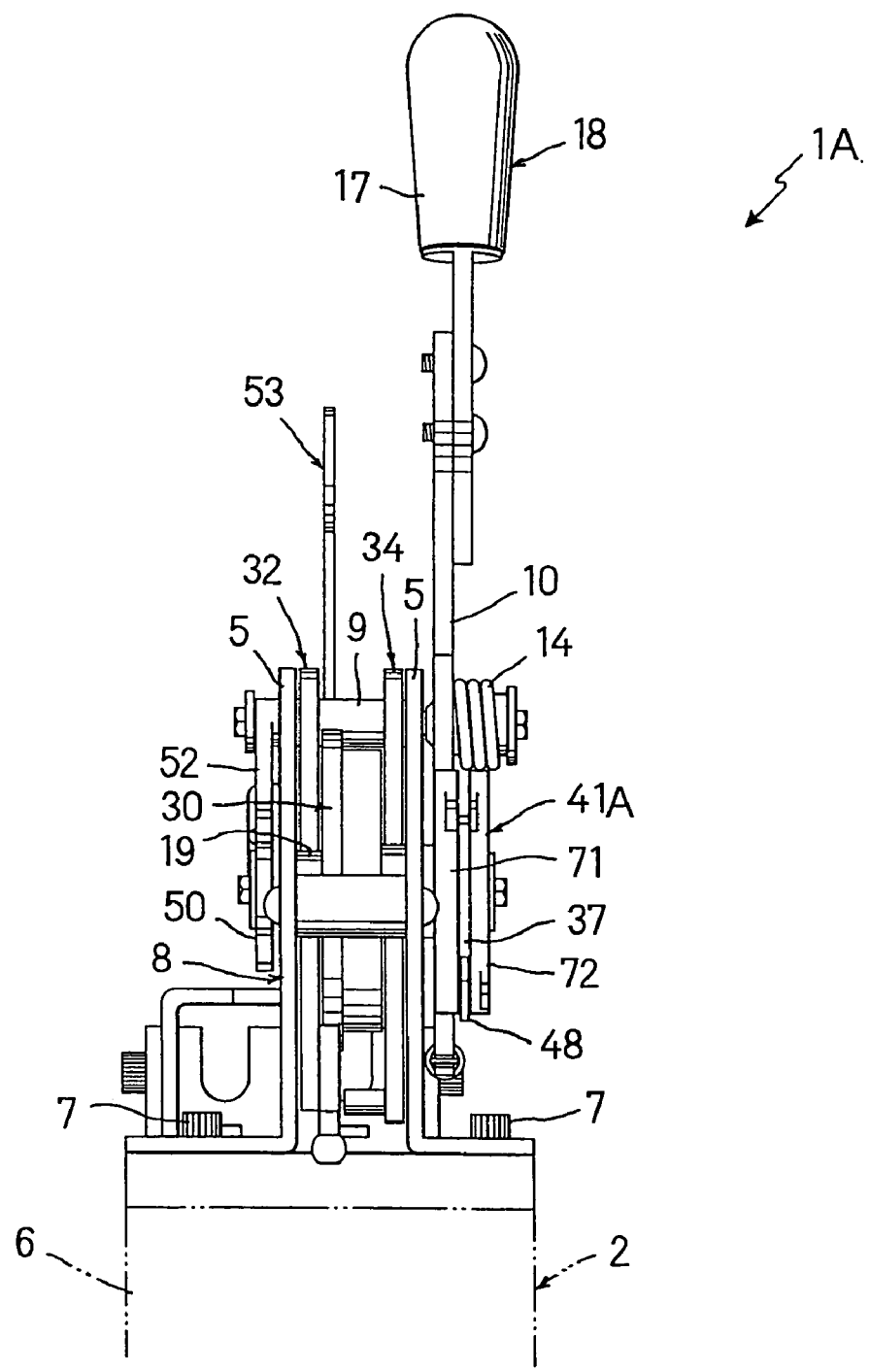
FIG. 24 is a front view showing a second embodiment of the present invention.
Figure 25:
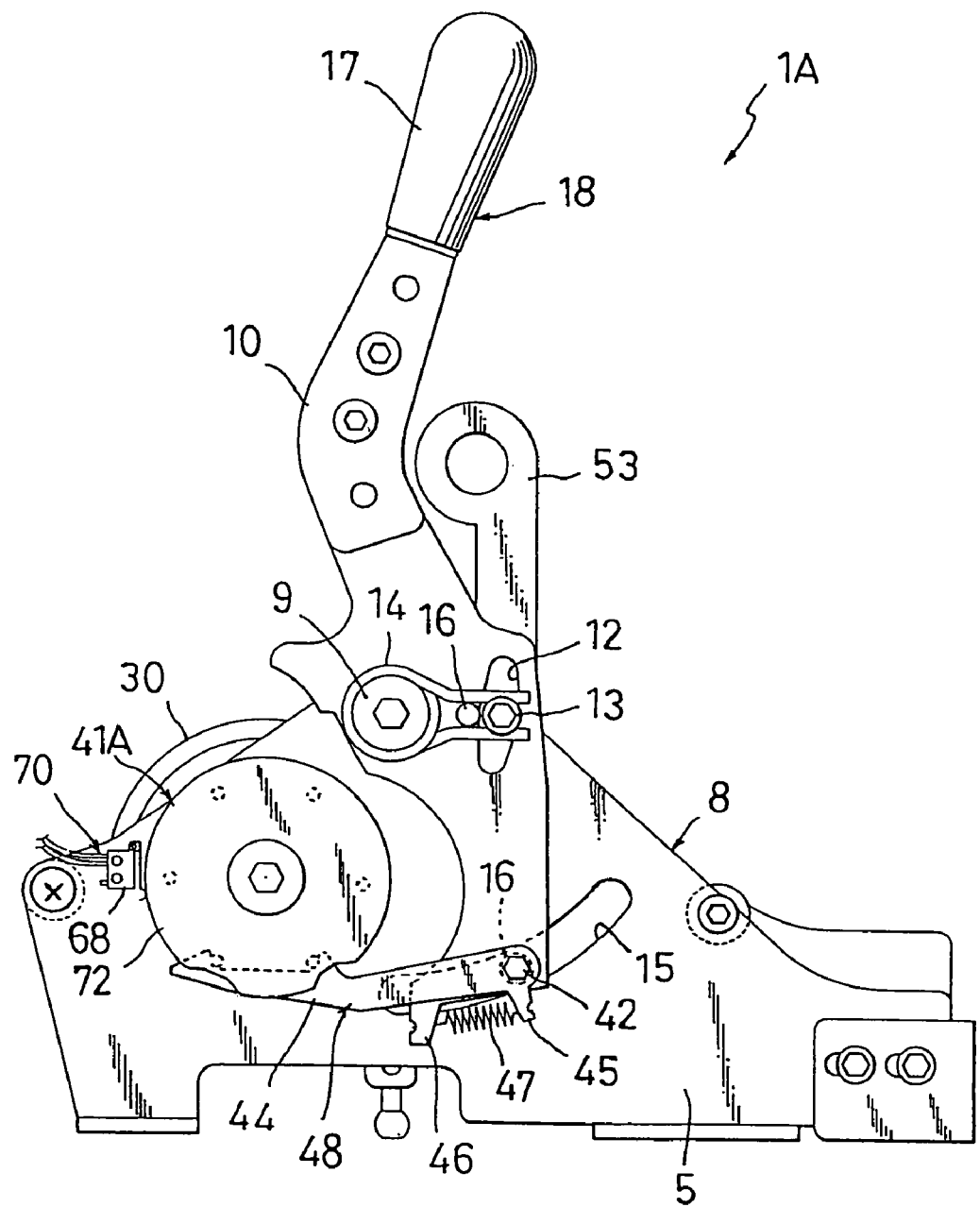
FIG. 25 is a right side view showing a second embodiment of the present invention.
Figure 26:
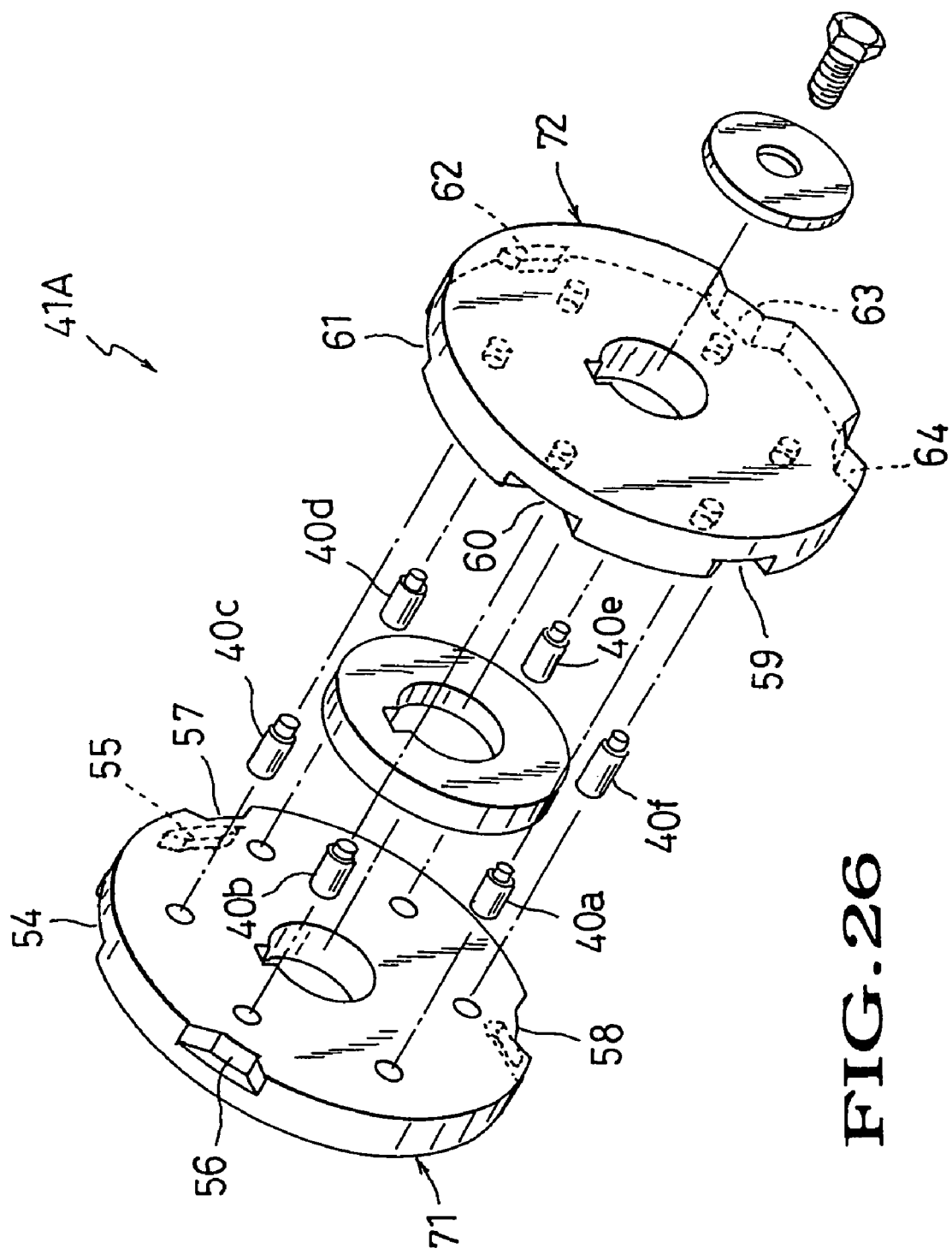
FIG. 26 is an expanded perspective view showing a rotary disk showing a second embodiment of the present invention.

A second embodiment of the present invention is shown in FIGS. 24 to 26 and provides a gearshift handling mechanism 1A distinguished from the first embodiment in that a rotary disk 41A including a first rotary plate and a second rotary plate 72 is provided. The gearshift handling mechanism 1A according to the second embodiment has similar advantages to that according to the first embodiment.

Figure 27:
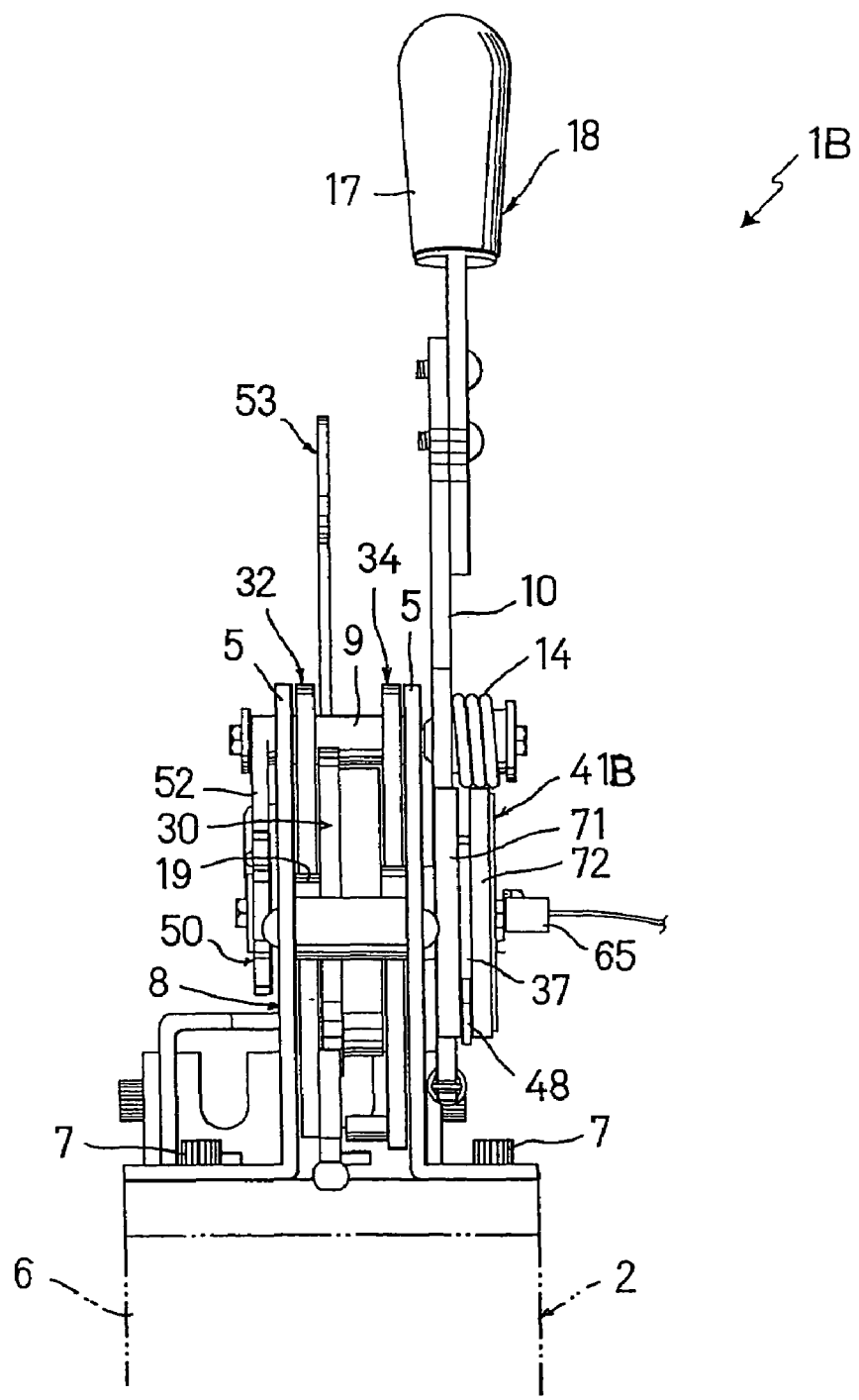
FIG. 27 is a front view showing a third embodiment of the present invention.
Figure 28:
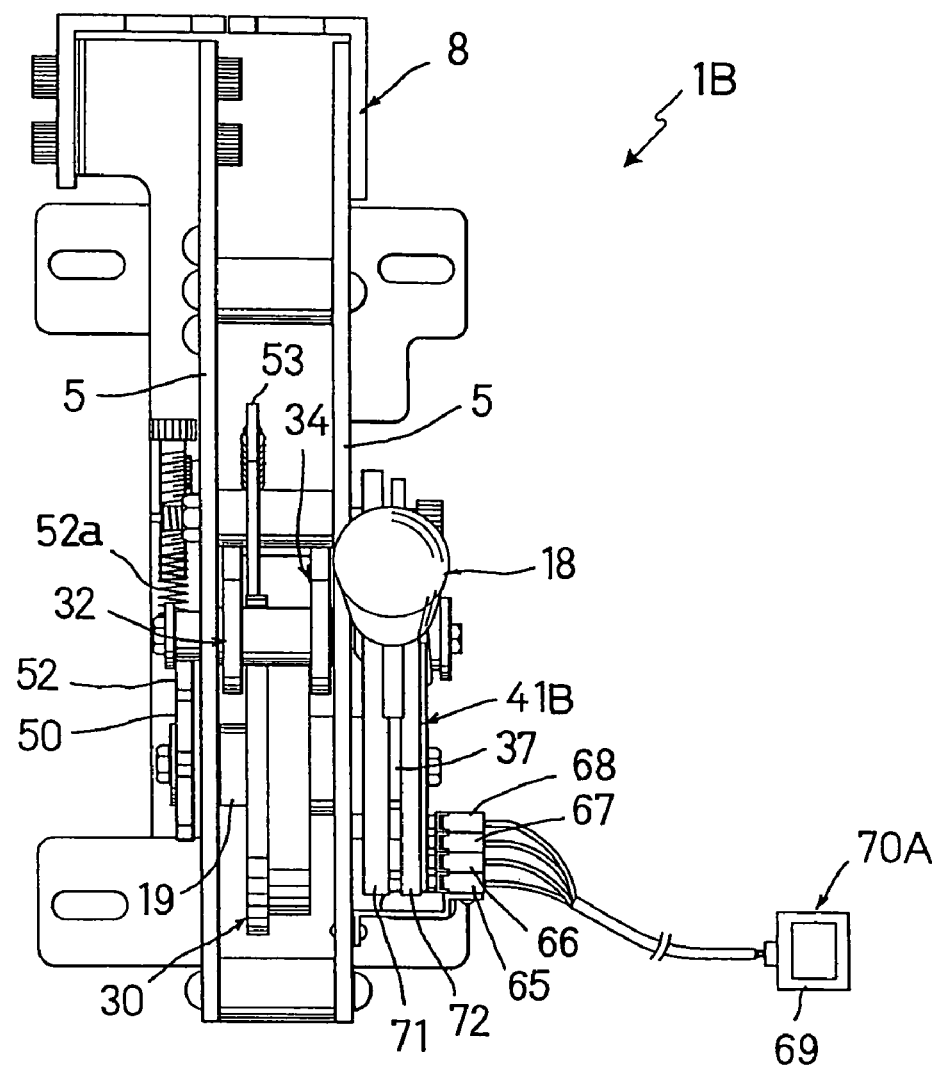
FIG. 28 is a top view showing a third embodiment of the present invention; and showing a second embodiment of the present invention.
Figure 29:
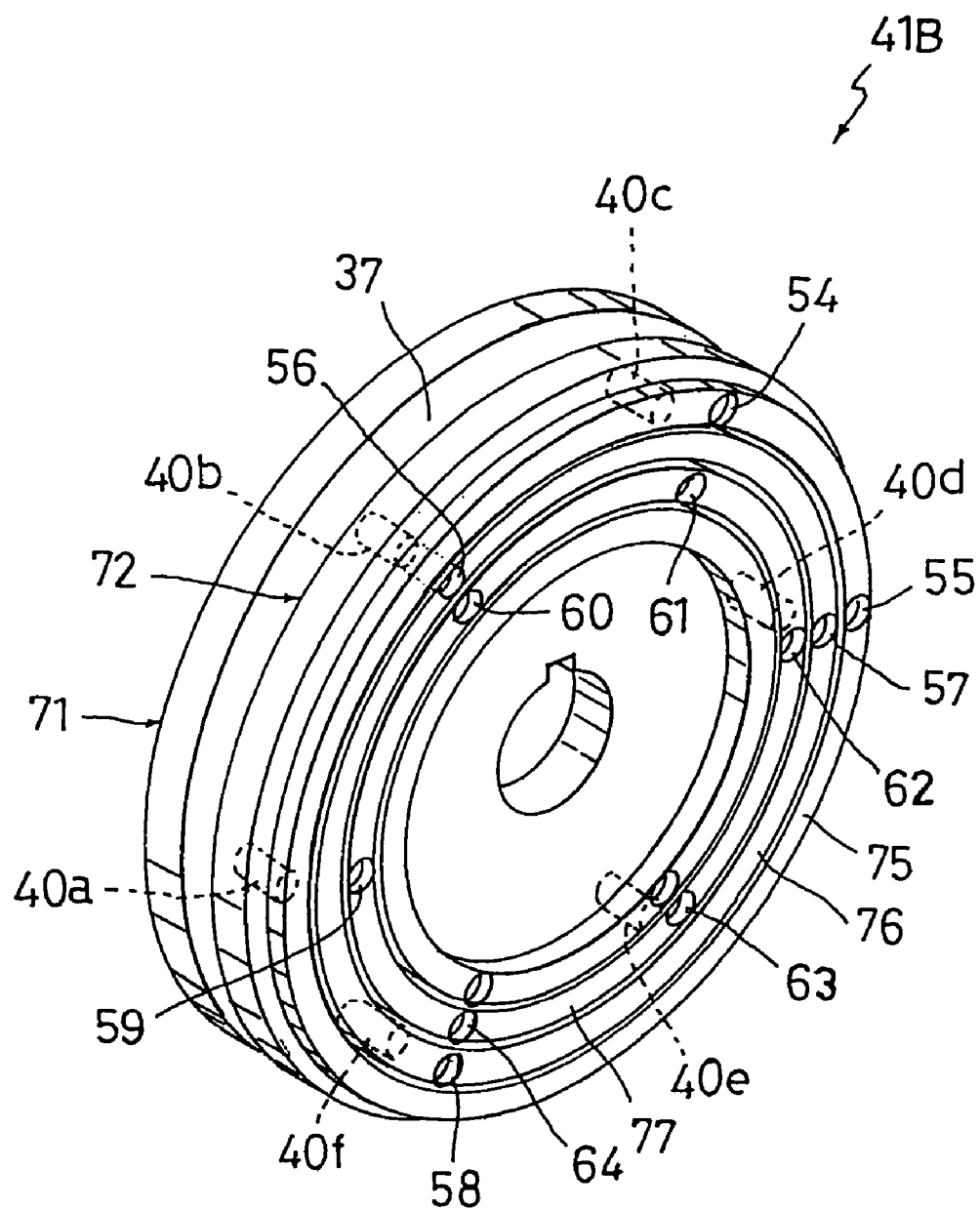
FIG. 29 is an explanation view showing a rotary disk

A third embodiment of the present invention is shown in FIGS. 27 to 29 and is distinguished from the second embodiment by the fact that a rotary disk 41B is formed concentrically a projection 73, which is formed in the shape of a ring, having the concave part 54 for second-speed and concave part 55 for third-speed which is positioned at the outer surface of the second rotary plate 72; a projection 74, which is formed in the shape of a ring, having the concave part 56 for first-speed, the concave part 57 for third-speed and the concave part 58 for fifth-speed; and a projection 75, which is formed in the shape of a ring, the concave part 59 for neutral, the concave part 60 for first-speed, the concave part 61 for second-speed, the concave part 62 for third-speed, the concave part 63 for fourth-speed and the concave part 64 for fifth-speed. In addition, a shift indicator 70A indicates the shifting state based on the above-mentioned concave parts for the indication. A gearshift handling mechanism 1B in this way according to the third embodiment has similar advantages to that according to the second embodiment.

INDUSTRIAL APPLICABILITY

The gearshift handling mechanism in this invention can be shifted endlessly into neutral, first-speed, second-speed, third-speed, fourth-speed, fifth-speed, neutral, first-speed, second-speed, third-speed, fourth-speed, fifth-speed so that it can be handled smoothly. In addition, the gears can be changed via the operation lever which is moved in the forward-backward direction so that the shifting can be operated smoothly and certainly. Moreover, it can be prevented to shift into fifth-speed from neutral via reverse lever so that it can be prevented to shifting mistake. Furthermore, it can be shifted into reverse due to rotate the reverse lever and operation lever to opposite direction

What is claimed is:

1. A gearshift handling mechanism comprising:

a case body attached in a box of a gear-shifting mechanism of a manual transmission having a pair of side plates which are placed at a fixed space;

a support axle attached at an upper part of the center portion of the case body so as to project both ends thereof from said side plates outwardly;

an operation lever attached to a part which is projected from one of said side plate of said support axle, shifting due to rotate at a predetermined degree, biasing by a spring to one way;

a pivot shaft attached rotatably at a part adjacent the one end of said case body so as to project both ends thereof from said side plates outwardly;

a cam for shifting the gear, which is attached fixedly to a part which is positioned between said side plates of said pivot shaft, having a first guide groove, which is formed in the shape of a ring, projecting three projections outwardly at one side surface thereof, capable of guiding a neutral, a first-speed, a second-speed, a third-speed, a fourth-speed, a fifth-speed and said neutral in series; a guide groove for reverse, guiding an outer circumferential part to a fifth-speed direction from a part between said neutral and said fifth-speed when it rotates to an opposite direction; a triangle eccentric second guide groove formed another surface thereof, which is formed in the shape of a ring, capable of guiding said neutral, said first-speed, said second-speed, said third-speed, said fourth-speed, said fifth-speed and said neutral clockwise and counterclockwise in series; and an engaging step part formed at said outer circumferential part of said one side surface, capable of preventing to shift into said fifth-speed from said neutral;

a first arm supported rotatably by said support axle which is placed between said side plates, having a first engaging pin formed at a top part thereof and engaging with said first guide groove and said guide groove for reverse of said cam, and handling said shift fork of said manual transmission via a wire or lot;

a second arm supported rotatably by said support axle which is placed between said side plates, having a second engaging pin formed at a top part thereof and engaging with said second guide groove of said cam, and handling said shift fork of said manual transmission via said wire or lot;

a rotary disk fixed to a projection part from one of said side plates of said pivot shaft, having engaging pins which are positioned between said neutral, said first-speed, said second-speed, said third-speed, said fourth-speed, said fifth-speed and positioned at a part adjacent the outer circumferential part between at least two rotary plates;

a rod supported pivotably at a lower part of said operation lever, engaging an engaging part defining a top portion thereof with said engaging pins of the rotary disk in series and allowing the rotary disk to rotate by in accordance with the rotation of said operation lever to the forward-backward direction, biasing said engaging part to the engaging direction against said engaging pins;

a fitting cam attached fixedly to a projected part from said another side plate of said pivot shaft, having six concave parts, capable of fitting said pivot shaft to said neutral, said first-speed, said second-speed, said third-speed, said fourth-speed, said fifth-speed;

a fitting piece fixed to a projection part from said another side plate of said support axle, having an engaging piece which engages with said concave parts of the fitting cam; and a reverse lever which engages with an engaging step part which is attached to the case body so as to bias to contact with the outer part which is formed said engaging step part of said cam and is prevented to shift into said fifth-speed from said neutral, capable of shifting into said reverse in accordance with releasing an engaging state.

2. A gearshift handling mechanism comprising:

a case body attached in a box of a gear-shifting mechanism of a manual transmission having a pair of side plates which are placed at a fixed space;

a support axle attached at an upper part of the center portion of the case body so as to project both ends thereof from said side plates outwardly;

an operation lever attached to a part which is projected from one of said side plate of said support axle, shifting due to rotate at a predetermined degree, biasing by a spring to one way;

a pivot shaft attached rotatably at a part adjacent the one end of said case body so as to project both ends thereof from said side plates outwardly;

a cam for shifting the gear, which is attached fixedly to a part which is positioned between said side plates of said pivot shaft, having a first guide groove, which is formed in the shape of a ring, projecting three projections outwardly at one side surface thereof, capable of guiding a neutral, a first-speed, a second-speed, a third-speed, a fourth-speed, a fifth-speed and said neutral in series; a guide groove for reverse, guiding an outer circumferential part to a fifth-speed direction from a part between said neutral and said fifth-speed when it rotates to an opposite direction; a triangle eccentric second guide groove formed another surface thereof, which is formed in the shape of a ring, capable of guiding said neutral, said first-speed, said second-speed, said third-speed, said fourth-speed, said fifth-speed and said neutral clockwise and counterclockwise in series; and an engaging step part formed at said outer circumferential part of said one side surface, capable of preventing to shift into said fifth-speed from said neutral;

a first arm supported rotatably by said support axle which is placed between said side plates, having a first engaging pin formed at a top part thereof and engaging with said first guide groove and said guide groove for reverse of said cam, and handling said shift fork of said manual transmission via a wire or lot;

a second arm supported rotatably by said support axle which is placed between said side plates, having a second engaging pin formed at a top part thereof and engaging with said second guide groove of said cam, and handling said shift fork of said manual transmission via said wire or lot;

a rotary disk fixed to a projection part from one of said side plates of said pivot shaft, having engaging pins which are positioned between said neutral, said first-speed, said second-speed, said third-speed, said fourth-speed, said fifth-speed and positioned at a part adjacent the outer circumferential part between said second and said third plates;

a shift indicator which indicates a shifting state via four switches which operated by concave parts for said second and third-speed, which is formed at outer circumferential parts of said second-speed and said third-speed of the rotary disk 41; concave parts for said first, third and fifth-speed, which is formed at outer circumferential parts of said first-speed, said third-speed and said fifth-speed of said second rotary plate; concave parts for said first, second, third, fourth and fifth-speed, which is formed at outer circumferential parts of said neutral, said first-speed, said second-speed, said third-speed, said fourth-speed and said fifth-speed of said third rotary plate; concave parts for said fourth and fifth-speed, which is formed at outer circumferential parts of said fourth-speed and said fifth-speed of said fourth rotary plate; and a concave part for indicating provided at outer circumferential parts of said first, second, third and fourth rotary plates;

a rod supported pivotably at a lower part of said operation lever, engaging an engaging part defining a top portion thereof with said engaging pins of the rotary disk in series and allowing the rotary disk to rotate by in accordance with the rotation of said operation lever to the forward-backward direction, biasing said engaging part to the engaging direction against said engaging pins;

a fitting cam attached fixedly to a projected part from said another side plate of said pivot shaft, having six concave parts, capable of fitting said pivot shaft to said neutral, said first-speed, said second-speed, said third-speed, said fourth-speed, said fifth-speed;

a fitting piece fixed to a projection part from said another side plate of said support axle, having an engaging piece which engages with said concave parts of the fitting cam; and a reverse lever which engages with an engaging step part which is attached to the case body so as to bias to contact with the outer part which is formed said engaging step part of said cam and is prevented to shift into said fifth-speed from said neutral, capable of shifting into said reverse in accordance with releasing an engaging state.

* * * * *